(12) United States Patent
Vermeersch et al.

(10) Patent No.: US 9,157,522 B2
(45) Date of Patent: Oct. 13, 2015

(54) SHIFT CONTROL DEVICE FOR AN AUTOMATIC TRANSMISSION

(71) Applicant: Steering Solutions IP Holding Corporation, Saginaw, MI (US)

(72) Inventors: Michael C. Vermeersch, Essexville, MI (US); Arthur W. Nellett, Davidson, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 421 days.

(21) Appl. No.: 13/712,173

(22) Filed: Dec. 12, 2012

(65) Prior Publication Data

US 2013/0145889 A1  Jun. 13, 2013

Related U.S. Application Data

(60) Provisional application No. 61/569,483, filed on Dec. 12, 2011.

(51) Int. Cl.
*F16H 59/02* (2006.01)
*F16H 61/24* (2006.01)

(52) U.S. Cl.
CPC ............... *F16H 59/02* (2013.01); *F16H 61/24* (2013.01); *F16H 2061/243* (2013.01); *Y10T 74/20177* (2015.01)

(58) Field of Classification Search
CPC .... F16H 59/02; F16H 2061/243; F16H 61/24
See application file for complete search history.

(56) References Cited

U.S. PATENT DOCUMENTS

| | | | | |
|---|---|---|---|---|
| 5,865,066 A * | 2/1999 | Osborn et al. | ................ | 74/502.4 |
| 5,902,209 A * | 5/1999 | Moody | ........................... | 477/99 |
| 6,487,927 B1 * | 12/2002 | Sputhe | ........................ | 74/473.23 |
| 6,526,842 B1 * | 3/2003 | Tanaka et al. | ................ | 74/473.1 |
| 6,658,960 B2 * | 12/2003 | Babin et al. | ................ | 74/473.28 |
| 7,597,023 B2 * | 10/2009 | Kortge et al. | ............... | 74/473.25 |
| 7,654,170 B2 * | 2/2010 | Wittkopp | ................... | 74/473.35 |
| 7,832,302 B2 * | 11/2010 | Wang | ......................... | 74/473.23 |
| 2003/0056614 A1 * | 3/2003 | Babin et al. | ................ | 74/473.28 |
| 2007/0137362 A1 * | 6/2007 | Kortge et al. | .............. | 74/473.18 |
| 2008/0163714 A1 * | 7/2008 | Wang | ......................... | 74/473.23 |

* cited by examiner

*Primary Examiner* — David M Fenstermacher
(74) *Attorney, Agent, or Firm* — Cantor Colburn LLP

(57) ABSTRACT

A shift control device for an automatic transmission comprises a referee shift control bracket mounted to a vehicle and an actuated shift control bracket that is actuated relatively to the referee shift control bracket. The referee shift control bracket cooperates with the actuated shift control bracket to define a path of travel of the actuated shift control bracket relative to the referee shift control bracket. The actuated shift control bracket is coupled, through a shift linkage system, to the automatic transmission such that a movement of the actuated shift control bracket along the path of travel to a first position corresponds to actuation of the automatic transmission into a first gear position. The referee shift control bracket cooperating with the actuated shift control bracket to define at least one detent positioned along said path of travel, said at least one detent corresponding to the first gear position.

19 Claims, 6 Drawing Sheets

SHIFT CONTROL DEVICE FOR AN AUTOMATIC TRANSMISSION

RELATED APPLICATION

The present patent application claims the benefit of priority from U.S. provisional patent application No. 61/569,483 filed on Dec. 12, 2011.

BACKGROUND

The present invention relates to a shift control device for an automatic transmission of a vehicle such as an automobile, and particularly, to a system for shifting a vehicle transmission and for providing improved tactile feel that is synchronized with the shifting operation.

Vehicles equipped with an automatic transmission often include a shift control lever mounted on a console, the dashboard, or the steering column of the vehicle. A vehicle operator may manually move the shift control lever between shift lever positions so as to change the gear position in which the transmission is engaged and thereby actuate the transmission into a desired gear position.

In general, when an operator of a vehicle operates a control mechanism, such as a shift lever, the vehicle operator seeks feedback in order to know how hard or how far to push or pull or turn the lever. In some cases, the feedback is provided visually by a display. Additional feedback may also be provided in the form of tactile feel. When an operator encounters feedback in the form of tactile feel, the operator senses a tendency in the control mechanism toward or away from a particular position of the control actuator (e.g., lever, knob, dial, wheel). To overcome the tendency, the operator typically must oppose it with an increased level of force.

A shift control lever may employ a leaf spring mechanism within the transmission to help overcome the frictional forces of the shift control lever and the associated linkage system and to aid in completing a shifting operation in the event the operator fails to independently complete the shifting operation. In systems where the frictional forces are excessive, or where excessive play may develop between the shift control lever and the associated linkage system, the shift control lever and its associated linkage system may become misaligned from the transmission. In addition, the imposition of frictional forces at points in the linkage system between the transmission and the shift control lever can result in a loss of tactile feel at the shift control lever.

Accordingly, it is desirable to have a system for shifting a vehicle transmission that provides improved tactile feel to the operator and that can be synchronized with shifting operations within the transmission.

SUMMARY OF THE INVENTION

According to one aspect of the invention, a shift control device for an automatic transmission comprises a referee shift control bracket mounted to a vehicle and an actuated shift control bracket that is actuated relatively to the referee shift control bracket. The referee shift control bracket cooperates with the actuated shift control bracket to define a path of travel of the actuated shift control bracket relative to the referee shift control bracket. The actuated shift control bracket is coupled, through a shift linkage system, to the automatic transmission such that a movement of the actuated shift control bracket along the path of travel to a first position corresponds to actuation of the automatic transmission into a first gear position. The referee shift control bracket cooperating with the actuated shift control bracket to define at least one detent positioned along said path of travel, said at least one detent corresponding to the first gear position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
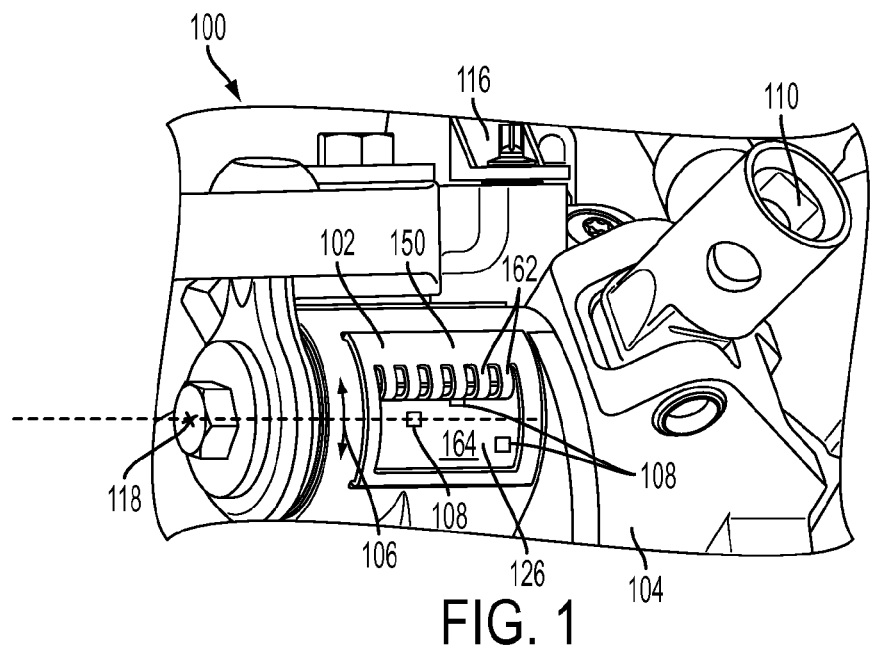
FIG. 1 shows a perspective view of an exemplary embodiment of a shift control device for an automatic transmission.

The following description is merely exemplary in nature and is not intended to limit the present disclosure, application, or uses. It should be understood that throughout the drawings, corresponding reference numerals indicate like or corresponding parts and features.

Referring now to the figures, where the invention will be described with reference to specific embodiments without limiting same, FIGS. 1-6 show various exemplary embodiments of a shift control device 100 for providing tactile feel to a vehicle operator as the vehicle operator manipulates the shift control device 100 so as to shift a transmission (not shown) of the vehicle. In accordance with the various embodiments disclosed herein, improved tactile feel may be provided to the operator with improved synchronization between tactile feedback and shifting actions accomplished within a transmission (not shown). In an exemplary embodiment, a shift control device 100 for an automatic transmission comprises a referee shift control bracket 102. In an exemplary embodiment, the referee shift control bracket 102 is stationary relative to some other structures (such as an actuated shift control bracket 104) and may actually be fixed to a structure 116 of the vehicle. The actuated shift control bracket 104 is linked to the movement of the shifting mechanism of an automatic transmission such that as an operator shifts from one gear position to another, the actuated shift control bracket 104 moves correspondingly. In an exemplary embodiment, the actuated shift control bracket 104 is movable with at least one degree of freedom relatively to the referee shift control bracket 102. The degree of freedom may involve linear motion of a portion of the shift control device 100 or may involve rotational movement of the actuated shift control bracket 104 about a control axis 118 that is associated with the shift control device 100.

In an exemplary embodiment, the referee shift control bracket 102 is mounted so as to be mechanically coupled to a structure 116 of the vehicle such as a dashboard or a steering column or a floor console. The structure 116 to which the referee shift control bracket 102 is to be mounted may be relatively closely coupled to the control lever that the operator is to manipulates so that the tactile feel may be much less attenuated, and may be less susceptible to hysteresis, associated with lengthy mechanical connections to a remotely located transmission shift mechanism. The actuated shift control bracket 104 cooperates with the referee shift control bracket 102 to define a path 106 along which the actuated shift control bracket 104 travels relative to the referee shift control bracket 102. In an exemplary embodiment, the actuated shift control bracket 104 is coupled, through a shift control device 100, to the automatic transmission (not shown) such that a movement of the actuated shift control bracket 104 to a first position 120 along the path 106 corresponds to actuation of the transmission into a first gear position. In an exemplary embodiment, the referee shift control bracket 102 cooperates with the actuated shift control bracket 104 to define one or more detents 108 positioned along the path 106, with the at least one of the detents 108 corresponding to the first gear position.

It should be appreciated that a variety of means may be employed for coupling movement of a shift control device 100 to an automatic transmission. Exemplary means include mechanical linkages, transmission of optical or electronic signals, or other means known in the art. A shift control arm 110 may be joined to or otherwise supported on the actuated shift control bracket 104 to aid in its movement (i.e., actuation or operation).

To reduce the occurrence of misalignment between the actuated shift control bracket 104 and the automatic transmission or other controlled system, a supplemental artificial feel mechanism is provided. The artificial feel mechanism is configured to facilitate improved synchronization of movements between the shift control arm 110 and the positioning of the automatic transmission into at least one gear position such as the first gear position. In the various exemplary embodiments disclosed herein, shift control mechanisms are provided that can be adapted to existing shift systems, such as shift systems for use with a vehicle steering system, so as to provide a style of artificial feel that can be tuned to provide a more positive positioning of the column shift mechanism in sync with the vehicle transmission.

FIGS. 1-6 show exemplary embodiments of a shift control device 100 for an automatic transmission wherein a referee shift control bracket 102 is configured and disposed so as to interact with an actuated shift control bracket 104 as the actuated shift control bracket 104 moves relative to the referee shift control bracket 102, as the operator manipulates the shift control arm 110. A referee shift control bracket 102 is fixed to the vehicle in a position adjacent to a follower 126 or other feature of the actuated shift control bracket 104 such that the referee shift control bracket 102 and the actuated shift control bracket 104 define one or more detents 108 that are positioned along the path 106 where brackets 102, 104 interact. Each of the one or more detents 108 includes a detent center 114 defined by the interaction of the brackets 102, 104 (e.g, by the interaction of the follower 126 and the adjacent elements) as the follower 126 moves toward, or moves away from, the detent center 114 and when the follower 126 is proximate the detent center 114. The detent center 114, therefore, defines a positional relationship between the actuated shift control bracket 104 and the referee shift control bracket 102. Accordingly, when calibrated properly, an operational relationship is established between the shift control arm 110 and the gear positions of the automatic transmission (not shown). In an exemplary embodiment, as shown in FIG. 1, the referee shift control bracket 102 may include a detent bar 112 for interacting with the follower. In an exemplary embodiment, the detent bar is configured as a referee spring clip 150, which defines a plurality of (e.g., four, five, six, seven) spring arm plungers 162 along the path 106. In an exemplary embodiment, the follower 126 is configured as a drum 164 that defines a plurality of indentations 108 in the surface of the drum 164. As the follower 126 follows the movement of the actuated shift control bracket 104, and the drum therefore rotates about its axis 118, each of the spring arm plungers 162 encounters an indentation 108 at an appropriate location along the path 106, thereby defining a detent 108.

In an exemplary embodiment, the actuated shift control bracket 104 (e.g., the drum 164) is configured to rotate about a control axis 118 as the control arm 110 is manipulated. The follower 126 (e.g., the surface of the drum 164 in FIGS. 1-3) is positioned a radial distance from the control axis 118 and, therefore, traces a path 106 that is arc shaped as the actuated shift control bracket 104 rotates about the control axis 118. The detent bar 112 (i.e., the spring clip 150 and its spring arm plungers 162 is similarly shaped (i.e., conforming to the arc-shaped path 106) so as to be positioned along the path 106 of the follower 126. In an exemplary embodiment, the position and orientation of the detent bar 112 may be adjusted by manipulating one or more of the calibration screws (not shown) or other adjustment features, which are configured to facilitate adjustments to the detent bar 112. As one skilled in the art will appreciate, the follower 126 may comprise any structure disposed and configured to define one or more detents and to thereby transmit feedback, in the form of a tactile feel (i.e. a variation in resistance or assistance to movement) to the operator.

In these embodiments, as the actuated shift control bracket 104 rotates about the control axis 118, the follower 126 (e.g., drum 164) moves about the control axis 118. As the follower 126 interacts with each detent 108 (e.g., deforming a spring arm plunger 162 so as to store energy in the spring arm plunger 162 as the follower 126 encounters and passes over a contour or ridge or into an indentation 108 or over a hump that may define a detent center 114, or allowing the spring arm plunger 162 to relax and thereby release its stored energy as the follower 126 departs a ridge or hump (or more closely approaches a detent center 114) the follower 126 moves in a direction that is substantially perpendicular to the control axis 118. It should be appreciated, however, that other configurations are possible such as wherein the follower 126 moves in a direction that is substantially perpendicular to a plane in which the actuated shift control bracket 104 rotates (i.e., substantially parallel to the control axis 118).

The surface of the detent bar 112 (e.g., the indentations 108 in the drum 164) defines one or more a detent center 114 as an indentation 108 or series of indentations 108, each indentation 108 being positioned so that the follower 126 (i.e., the drum 164), which follows the movement of the actuated shift control bracket 104, causes each indentation 108 to encounter a corresponding spring arm plunger 162 when the transmission is in a desired gear position. As the shift control approaches a detent 108, the spring arm plunger is first forced deeper into the indentation 108, thereby changing the deflection of the spring arm plunger 162. Accordingly, an operator may perceive the deformation or relaxation as resistance to or reinforcement of movement of the control arm 110.

As the operator continues to move the control arm 110 such that the follower 126 (e.g., the feeler rod) more closely approaches the detent center 114 of the indentation 108, the spring arm plunger 162 is able to enter the indentation 108 more deeply, allowing the spring arm plunger 162 to expand and to thereby release some of its stored energy. As a result, the operator may perceive a biasing of the control arm 110 toward a position associated with the detent center 114 of the control feature. Once the control arm 110 occupies a position associated with the detent center 114, the control arm 110 may be biased to remain in that position until a force is applied to the control arm 110 that is sufficient to force the spring arm plunger 162 to be again compressed. As a result, the operator may be enabled to experience a tactile feel produced by the interaction of the follower 126 (via any of the mechanisms disclosed herein) and the detent bar 112 (or the other embodiments of a referee shift control bracket 102 disclosed herein). The tactile feel experienced by the operator may therefore be set so that an operator may perceive a mechanical resistance typically associated with a shifting of a transmission even though no such mechanical resistance may be produced by the transmission being shifted.

It should be appreciated that the follower 126 may be disposed such that its follower axis disposed in a plane that is substantially perpendicular to the control axis 118. It should also be appreciated that the follower 126 may be disposed with its follower axis being substantially parallel to the control axis 118. The follower 126 may be disposed on a cantilevered spring arm such that the cantilevered spring arm absorbs and releases energy as the follower 126 moves over each detent 108.

It should be appreciated that the detent center 114 of each detent 108 may be defined by any set of features that either impede or aid the movement of the follower 126 along the path 106. For example, they may be defined be a pair of ridges that are oriented transversely to the path 106 of the as the spring arm plunger 162 follows the contours of the drum 164. Each detent center 114 is sufficiently wide that the tip of the spring arm plunger 162 may fit within the detent center 114, thereby providing the operator with a tactile feedback as the tip of each spring arm plunger 162 enters a detent center 114. It should be appreciated that each of the indentations 108 or other variations in the surface of the drum 164 (e.g., ridges or humps) may be shaped so as to provide desirable variations in resistance and assistance to movement of the actuated shift control bracket 104 dependent upon position. The positions of each of the features (e.g., indentations, humps, and ridges), and thus of the detents defined by those features may be adjusted so as to correspond to positions of the gears of the automatic transmission.

For example, the detent center 114 of each detent 108 may be configured as a narrow channel that is oriented transverse to the relative path 106 of the spring arm plunger 162 as the drum 164 follows the movement of the control arm 110. Each detent center 114 need only be sufficiently wide that the tip of the spring arm plunger 162 may fit within the detent center 114, thereby providing the operator with a tactile feedback as the tip of the spring arm plunger 162 enters the detent center 114. In accordance with this embodiment, the spring arm plunger 162 must deform whenever the tip of the spring arm plunger is forced by the control arm 110 to exit the narrow channel that is (i.e., that defines and lends a characteristic feel of) the detent center 114. It should be appreciated that the shape of the detent 108 (i.e., the steepness or shallowness of the contours that define the detent 108) and the strength of the spring that is caused to deform may strongly impact the tactile feel experienced by an operator manipulating the control arm 110.

Figure 2:
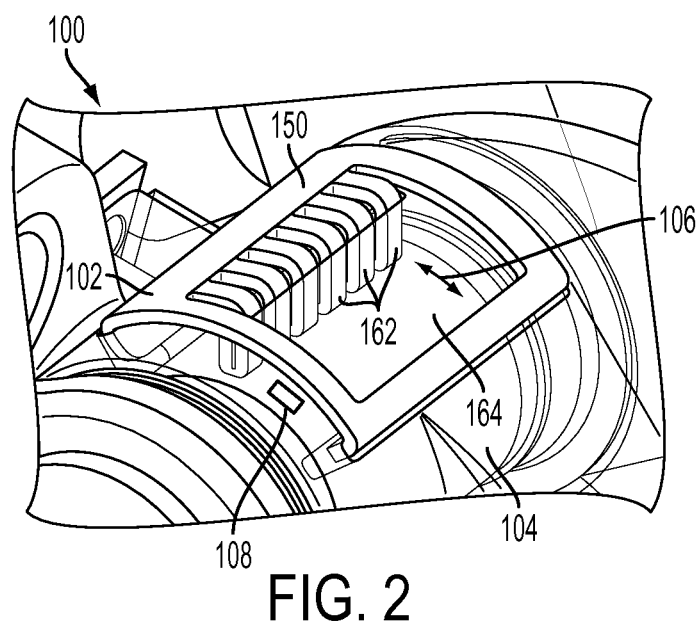
FIG. 2 shows another perspective view of the shift control device shown in FIG. 1.
Figure 3:
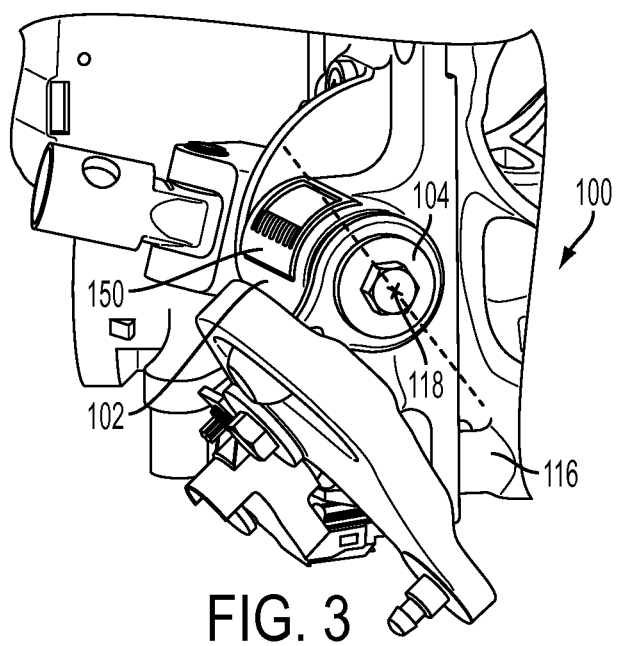
FIG. 3 shows another perspective view of an exemplary embodiment of the shift control device shown in FIG. 1 and FIG. 2.

As shown in FIGS. 1-3, the referee shift control bracket 102 comprises a referee spring clip 150 that supports a series of tunable spring arm plungers 162. An actuated shift control bracket 104 defines a drum 164, over which the series of tunable spring arm plungers 162 rides. The drum 164 defines a series of shaped surface features (e.g., indentations or grooves or dimples or depressions) into which or over which the tunable spring arm plungers 162 are biased to move. In an exemplary embodiment, the tunable spring arm plungers 162 are biased by the spring clip 150 inwardly toward the drum 164 of the actuated shift control bracket 104. As the actuated shift control bracket 104 travels through the range of motion defined by interaction between the referee shift control bracket 102 and the actuated shift control bracket 104, the interaction of the tunable spring arm plungers 162 and the grooves defined by the drum 164 forms a series of detents 108 that tend to arrest the movement of the actuated shift control bracket 104 relatively to the referee shift control bracket 102.

The detents 108 are positioned so as to correspond to actuation of the automatic transmission into its various gear positions. Accordingly, each detent 108 provides resistance to movement of the actuated shift control bracket 104 from a position that corresponds to actuation of the transmission into a discrete gear position. Put another way, each detent 108 provides a biasing tendency of the actuated shift control bracket 104 toward a position that corresponds to actuation of the transmission into a discrete gear position.

In addition to biasing the actuated shift control bracket 104 toward positions corresponding to actuation of various gears of the transmission, the detents 108 provide artificial tactile feel that can be perceived by the operator of the vehicle. This tactile feel can be particularly useful when the actuation of the transmission is electronic or optical rather than purely mechanical.

Figure 4:
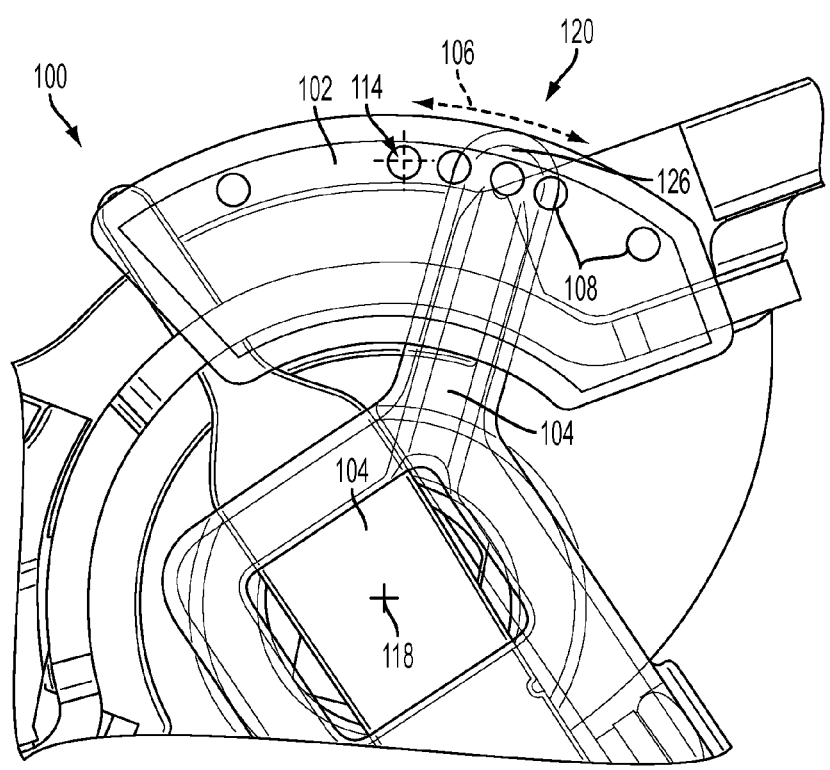
FIG. 4 shows a side view of another exemplary embodiment of a shift control device for an automatic transmission.
Figure 5:
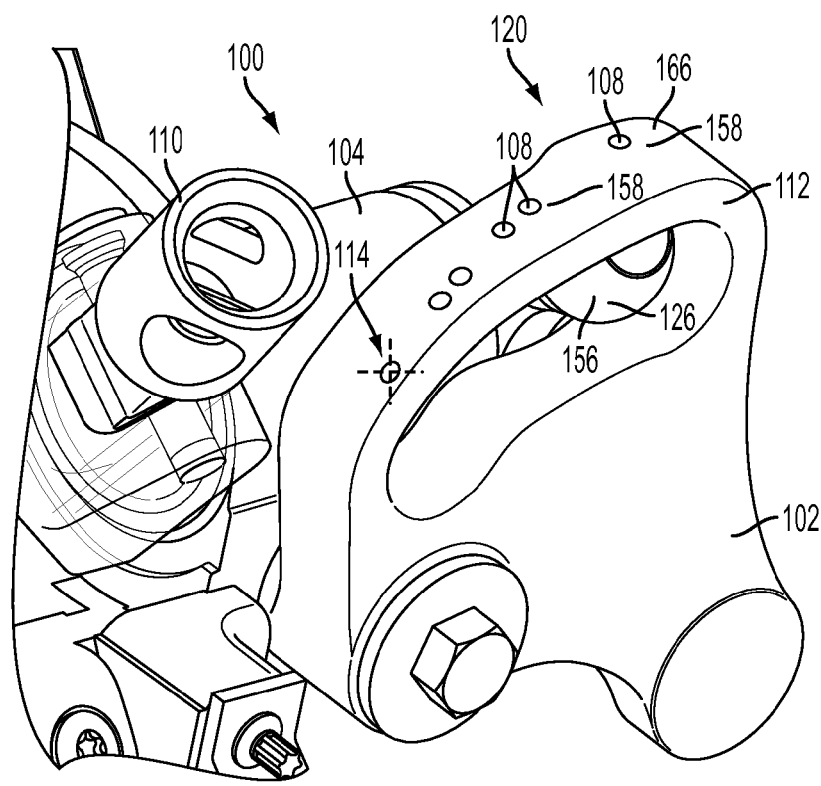
FIG. 5 shows a perspective view of another exemplary embodiment of a shift control device for an automatic transmission.
Figure 6:
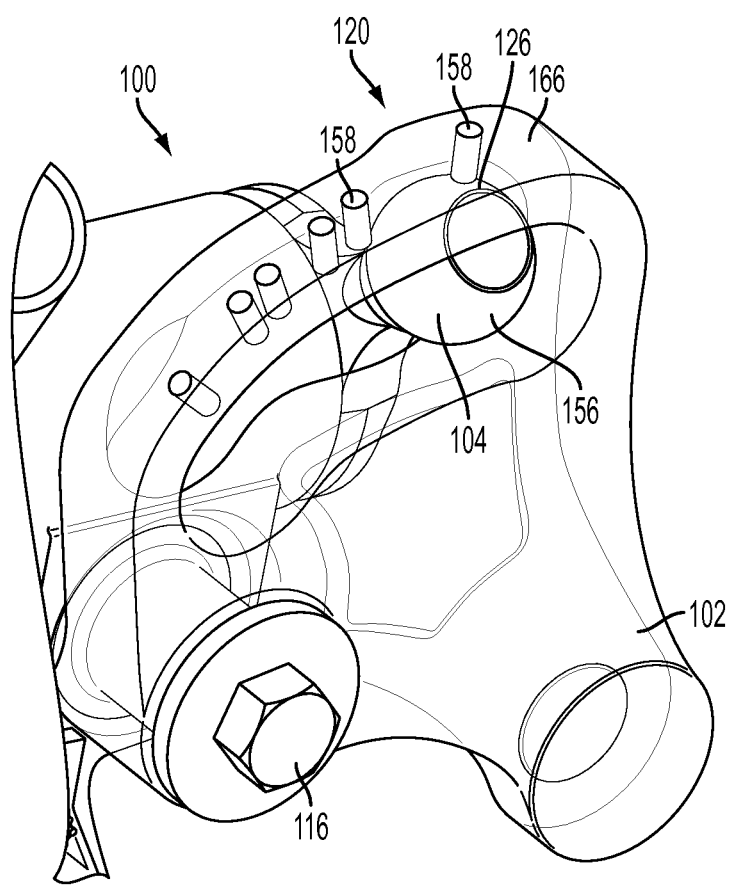
FIG. 6 shows another perspective view of the shift control device shown in FIG. 5.

FIGS. 4-6 show another exemplary embodiment of a shift control device 100 for an automatic transmission. As shown in FIGS. 4-6, an actuated shift control bracket 104 carries a series of magnets 158 (or magnetic receptors that may comprise masses of magnetically reactive material, such as iron, supported by a substrate of magnetically benign material, such as plastic) that cooperate with corresponding magnets 158 (or magnetic receptors) supported on a referee shift control bracket 102. In this exemplary embodiment, the actuated shift control bracket 104 carries a magnetically active (or reactive) element that passes over corresponding magnets 158 supported by the referee shift control bracket 102. The magnetically active or reactive elements of the actuated shift control bracket 104 and the magnets 158 of the referee shift control bracket 102 cooperate to form a series of detents 108 synchronized with desired actuation positions of the automatic transmission.

As shown in FIGS. 4-6, the referee shift control bracket 102 includes a steel actuator 156 that cooperates with corresponding magnets 158 inserted into a cam wall 166 of an actuated shift control bracket 104. It should be appreciated that a magnetically active element may be formed as a steel object disposed so as to interact magnetically with another magnet or may be formed as a magnet disposed so as to interact magnetically with another magnet. A magnetically reactive element is any element that reacts to a magnetic field (e.g., steel). In this exemplary embodiment, the magnets 158 of the actuated shift control bracket 104 cooperate with the steel actuator 156 to form a series of detents 108 synchronized with desired actuation positions of the automatic transmission.

It should be appreciated that the detents 108 are defined by the interaction between features of the actuated shift control bracket 104 and the referee shift control bracket 102. Therefore, it may be inconsequential whether a first set of elements, such as magnets, are to be disposed on either the actuated shift control bracket 104 or the referee shift control bracket 102, with the corresponding elements (e.g., elements comprising iron) being disposed on the remaining structure.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while the various embodiments of the invention have been described, it is to be understood that aspects of the invention may include only some of the described embodiments. Accordingly, the invention is not to be seen as limited by the foregoing description.

Having thus described the invention, it is claimed:

1. A shift control device for an automatic transmission, comprising:
    a referee shift control bracket mounted to a vehicle; and
    an actuated shift control bracket that is actuated relatively to the referee shift control bracket;
    the referee shift control bracket cooperating with the actuated shift control bracket to define a path of travel of the actuated shift control bracket relative to the referee shift control bracket;
    the actuated shift control bracket being coupled, through a shift linkage system, to the automatic transmission such that a movement of the actuated shift control bracket along the path of travel to a first position corresponds to actuation of the automatic transmission into a first gear position; and
    the referee shift control bracket cooperating with the actuated shift control bracket to define at least one detent positioned along said path of travel, said at least one detent corresponding to the first gear position, the referee shift control bracket comprises a referee spring clip that supports a plurality of tunable plungers.

2. The shift control device of claim 1, wherein the actuated shift control bracket includes a follower that moves with the actuated shift control bracket as an operator manipulates the actuated shift control bracket.

3. The shift control device of claim 2, wherein the at least one detent defines a detent center and is configured to interact with the follower as the follower moves toward or moves away from the detent center.

4. The shift control device of claim 2, wherein the referee shift control bracket comprises a detent bar that defines a plurality of detent features disposed along the path of travel as the follower follows the movement of the actuated shift control bracket.

5. The shift control device of claim 4, wherein a surface of the detent bar defines one or more indentations, each being positioned so that the follower, which follows the movement of the actuated shift control bracket, passes a center of an indentation when the automatic transmission is in a desired gear position.

6. The shift control device of claim 2, wherein the follower is positioned a radial distance from a control axis about which the actuated shift control bracket rotates and traverses an arc path as the actuated shift control bracket rotates about the control axis.

7. The shift control device of claim 2, wherein the follower comprises a cantilevered spring arm that cooperates with corresponding detent features of a referee shift control bracket.

8. The shift control device of claim 2, wherein the follower comprises a cantilevered spring arm, the cantilevered spring arm being disposed and configured to absorb energy as or release energy as the follower moves with a contour of a detent.

9. The shift control device of claim 1, wherein the actuated shift control bracket is configured to rotate about a control axis of rotation as the actuated shift control bracket is manipulated.

10. The shift control device of claim 1, wherein the actuated shift control bracket defines a drum.

11. The shift control device of claim 10, wherein each of the plurality of tunable plungers is disposed so as to press against the drum.

12. The shift control device of claim 11, wherein the drum defines a plurality of surface features that cooperate with the plurality of tunable plungers to define a plurality of detents.

13. The shift control device of claim 12, wherein a surface of the drum defines a plurality of indentations into which each plunger of the plurality of tunable plungers is biased to move, such that as a tip of each tunable plunger enters an indentation, movement of the actuated shift control bracket relatively to the referee shift control bracket is inhibited.

14. The shift control device of claim 1, wherein a detent center of each detent is defined be a pair of ridges that are oriented transverse to a path of a spring arm as the spring arm follows the movement of the actuated shift control bracket.

15. The shift control device of claim 14, wherein the detent center of each detent feature is defined by a narrow channel that is oriented transverse to a path of the spring arm follows the movement of the actuated shift control bracket.

16. A shift control device for an automatic transmission, comprising:
    a referee shift control bracket mounted to a vehicle; and
    an actuated shift control bracket that is actuated relatively to the referee shift control bracket;
    the referee shift control bracket cooperating with the actuated shift control bracket to define a path of travel of the actuated shift control bracket relative to the referee shift control bracket;
    the actuated shift control bracket being coupled, through a shift linkage system, to the automatic transmission such that a movement of the actuated shift control bracket along the path of travel to a first position corresponds to actuation of the automatic transmission into a first gear position;
    the referee shift control bracket cooperating with the actuated shift control bracket to define at least one detent positioned along said path of travel, said at least one detent corresponding to the first gear position;
    the actuated shift control bracket includes a follower that moves with the actuated shift control bracket as an operator manipulates the actuated shift control bracket;
    wherein the follower is magnetically active; and
    wherein the at least one detent is defined by a magnetically reactive element that is disposed in the referee shift control bracket and that is configured to interact magnetically with the follower when the follower is in close proximity with the magnetically reactive element.

17. A shift control device for an automatic transmission, comprising:
    a referee shift control bracket mounted to a vehicle; and
    an actuated shift control bracket that is actuated relatively to the referee shift control bracket;
    the referee shift control bracket cooperating with the actuated shift control bracket to define a path of travel of the actuated shift control bracket relative to the referee shift control bracket;

the actuated shift control bracket being coupled, through a shift linkage system, to the automatic transmission such that a movement of the actuated shift control bracket along the path of travel to a first position corresponds to actuation of the automatic transmission into a first gear position;

the referee shift control bracket cooperating with the actuated shift control bracket to define at least one detent positioned along said path of travel, said at least one detent corresponding to the first gear position;

the actuated shift control bracket includes a follower that moves with the actuated shift control bracket as an operator manipulates the actuated shift control bracket;

wherein the follower is magnetically reactive; and wherein the at least one detent is defined by a magnetically active element that is disposed in the referee shift control bracket and that is configured to interact magnetically with the follower when the follower is in close proximity with the magnetically active element.

18. A shift control device for an automatic transmission, comprising:

a referee shift control bracket mounted to a vehicle; and an actuated shift control bracket that is actuated relatively to the referee shift control bracket;

the referee shift control bracket cooperating with the actuated shift control bracket to define a path of travel of the actuated shift control bracket relative to the referee shift control bracket;

the actuated shift control bracket being coupled, through a shift linkage system, to the automatic transmission such that a movement of the actuated shift control bracket along the path of travel to a first position corresponds to actuation of the automatic transmission into a first gear position;

the referee shift control bracket cooperating with the actuated shift control bracket to define at least one detent positioned along said path of travel, said at least one detent corresponding to the first gear position;

the actuated shift control bracket includes a follower that moves with the actuated shift control bracket as an operator manipulates the actuated shift control bracket; and wherein the at least one detent is defined by a magnetically active element that is disposed in the actuated shift control bracket and that is configured to interact magnetically with a magnetically reactive element disposed in the referee shift control bracket when the magnetically reactive element is in close proximity with the magnetically active element.

19. A shift control device for an automatic transmission, comprising:

a referee shift control bracket mounted to a vehicle; and an actuated shift control bracket that is actuated relatively to the referee shift control bracket;

the referee shift control bracket cooperating with the actuated shift control bracket to define a path of travel of the actuated shift control bracket relative to the referee shift control bracket;

the actuated shift control bracket being coupled, through a shift linkage system, to the automatic transmission such that a movement of the actuated shift control bracket along the path of travel to a first position corresponds to actuation of the automatic transmission into a first gear position;

the referee shift control bracket cooperating with the actuated shift control bracket to define at least one detent positioned along said path of travel, said at least one detent corresponding to the first gear position;

the actuated shift control bracket includes a follower that moves with the actuated shift control bracket as an operator manipulates the actuated shift control bracket;

the referee shift control bracket comprises a detent bar that defines a plurality of detent features disposed along the path of travel as the follower follows the movement of the actuated shift control bracket; and wherein a position and orientation of the detent bar may be adjusted by manipulating one or more calibration screws, which are configured to facilitate adjustments to the detent bar.

* * * * *